US007690982B2

(12) United States Patent
Cuddy

(10) Patent No.: US 7,690,982 B2
(45) Date of Patent: Apr. 6, 2010

(54) GAMING DEVICE HAVING FREE SPIN GAME WITH TERMINATORS AND ANTI-TERMINATORS

(75) Inventor: Ryan W. Cuddy, Reno, NV (US)

(73) Assignee: IGT, Reno, NV (US)

( * ) Notice: Subject to any disclaimer, the term of this patent is extended or adjusted under 35 U.S.C. 154(b) by 1260 days.

(21) Appl. No.: 11/210,314

(22) Filed: Aug. 24, 2005

(65) Prior Publication Data

US 2006/0063585 A1 Mar. 23, 2006

Related U.S. Application Data

(60) Provisional application No. 60/611,823, filed on Sep. 21, 2004.

(51) Int. Cl.
*G06F 17/00* (2006.01)

(52) U.S. Cl. .......................................................... 463/20

(58) Field of Classification Search ............. 463/16–25, 463/9–12, 1; 273/138.1, 138.2, 139, 143 R
See application file for complete search history.

(56) References Cited

U.S. PATENT DOCUMENTS

| | | | |
|---|---|---|---|
| 4,198,052 | A | 4/1980 | Gauselmann |
| 4,448,419 | A | 5/1984 | Telnaes |
| 4,560,161 | A | 12/1985 | Hamano |
| 4,582,324 | A | 4/1986 | Koza et al. |
| 4,621,814 | A | 11/1986 | Stepan et al. |
| 4,624,459 | A | 11/1986 | Kaufman |
| 4,669,731 | A | 6/1987 | Clarke |

(Continued)

FOREIGN PATENT DOCUMENTS

| | | | |
|---|---|---|---|
| AU | 199716432 | B2 | 9/1997 |

(Continued)

OTHER PUBLICATIONS

Bally Slot Machines Electro-Mechanicals 1964-1980 Book [In Part], Revised 3rd Edition written by Marshall Fey.

(Continued)

*Primary Examiner*—Ronald Laneau
(74) *Attorney, Agent, or Firm*—K&L Gates LLP

(57) ABSTRACT

A gaming device having a free spin mode or sequence with terminators and anti-terminators. For each spin or activation of a plurality of reels in the free spin mode, the gaming device determines if at least one terminator symbol or at least one anti-terminator symbol is generated. If at least one terminator symbol is generated and at least one anti-terminator symbol is not previously retained, the free spin mode ends. If at least one terminator symbol is generated and at least one anti-terminator symbol is previously retained, the retained anti-terminator symbol is utilized to nullify the free spin ending effect of the terminator symbol and the free spin mode continues. If at least one anti-terminator symbol is generated, the free spin mode continues and the generated anti-terminator symbol is retained or accumulated until a terminator symbol is subsequently generated on another spin or activation of the reels. The free spin mode continues until at least one terminator symbol is generated and there are no retained anti-terminator symbols to nullify the effect of the generated terminator symbol.

30 Claims, 10 Drawing Sheets

U.S. PATENT DOCUMENTS

| | | | |
|---|---|---|---|
| 4,695,053 | A | 9/1987 | Vazquez, Jr. et al. |
| 4,838,552 | A | 6/1989 | Hagiwara |
| 4,991,848 | A | 2/1991 | Greenwood et al. |
| 5,019,973 | A | 5/1991 | Wilcox et al. |
| 5,033,744 | A | 7/1991 | Bridgeman et al. |
| 5,152,529 | A | 10/1992 | Okada |
| 5,178,390 | A | 1/1993 | Okada |
| 5,205,555 | A | 4/1993 | Hamano |
| 5,209,479 | A | 5/1993 | Nagao et al. |
| 5,342,047 | A | 8/1994 | Heidel et al. |
| 5,364,100 | A | 11/1994 | Ludlow et al. |
| 5,407,200 | A | 4/1995 | Zalabak |
| 5,449,173 | A | 9/1995 | Thomas et al. |
| 5,456,465 | A | 10/1995 | Durham |
| 5,524,888 | A | 6/1996 | Heidel |
| 5,536,016 | A | 7/1996 | Thompson |
| 5,542,669 | A | 8/1996 | Charron et al. |
| 5,560,603 | A | 10/1996 | Seelig et al. |
| 5,584,763 | A | 12/1996 | Kelly et al. |
| 5,611,535 | A | 3/1997 | Tiberio |
| 5,711,525 | A | 1/1998 | Breeding |
| 5,722,891 | A | 3/1998 | Inoue |
| 5,732,948 | A | 3/1998 | Yoseloff |
| 5,769,716 | A | 6/1998 | Saffari et al. |
| 5,772,509 | A | 6/1998 | Weiss |
| 5,775,692 | A | 7/1998 | Watts et al. |
| 5,779,544 | A | 7/1998 | Seelig et al. |
| 5,788,573 | A | 8/1998 | Baerlocher et al. |
| 5,807,172 | A | 9/1998 | Piechowiak |
| 5,823,874 | A | 10/1998 | Adams |
| 5,833,537 | A | 11/1998 | Barrie |
| 5,833,538 | A | 11/1998 | Weiss |
| 5,848,932 | A | 12/1998 | Adams |
| 5,851,148 | A | 12/1998 | Brune et al. |
| 5,873,781 | A | 2/1999 | Keane |
| 5,882,261 | A | 3/1999 | Adams |
| 5,902,184 | A | 5/1999 | Bennett et al. |
| 5,911,418 | A | 6/1999 | Adams |
| 5,919,088 | A | 7/1999 | Weiss |
| 5,934,672 | A | 8/1999 | Sines et al. |
| 5,935,002 | A | 8/1999 | Falciglia |
| 5,947,820 | A | 9/1999 | Morro et al. |
| 5,951,397 | A | 9/1999 | Dickinson |
| 5,964,463 | A | 10/1999 | Moore, Jr. |
| 5,967,894 | A | 10/1999 | Kinoshita et al. |
| 5,976,015 | A | 11/1999 | Seelig et al. |
| 5,980,384 | A | 11/1999 | Barrie |
| 5,984,781 | A | 11/1999 | Sunaga |
| 5,997,400 | A | 12/1999 | Seelig et al. |
| 5,997,401 | A | 12/1999 | Crawford |
| 6,004,207 | A | 12/1999 | Wilson, Jr. et al. |
| 6,015,346 | A | 1/2000 | Bennett |
| 6,019,369 | A | 2/2000 | Nakagawa et al. |
| 6,033,307 | A | 3/2000 | Vancura |
| 6,056,642 | A | 5/2000 | Bennett |
| 6,059,289 | A | 5/2000 | Vancura |
| 6,059,658 | A | 5/2000 | Mangano et al. |
| 6,062,980 | A | 5/2000 | Luciano |
| 6,089,976 | A | 7/2000 | Schneider et al. |
| 6,089,977 | A | 7/2000 | Bennett |
| 6,089,978 | A | 7/2000 | Adams |
| 6,093,102 | A | 7/2000 | Bennett |
| 6,102,400 | A | 8/2000 | Scott et al. |
| 6,102,798 | A | 8/2000 | Bennett |
| 6,113,098 | A | 9/2000 | Adams |
| 6,120,031 | A | 9/2000 | Adams |
| 6,120,378 | A | 9/2000 | Moody et al. |
| 6,126,541 | A | 10/2000 | Fuchs |
| 6,126,542 | A | 10/2000 | Fier |
| 6,135,885 | A | 10/2000 | Lermusiaux |
| 6,142,873 | A | 11/2000 | Weiss et al. |
| 6,142,874 | A | 11/2000 | Kodachi et al. |
| 6,142,875 | A | 11/2000 | Kodachi et al. |
| 6,146,273 | A | 11/2000 | Olsen |
| 6,149,156 | A | 11/2000 | Feola |
| 6,149,157 | A | 11/2000 | Suan |
| 6,149,521 | A | 11/2000 | Sanduski |
| 6,155,925 | A | 12/2000 | Giobbi et al. |
| 6,159,095 | A | 12/2000 | Frohm et al. |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,186,894 | B1 | 2/2001 | Mayeroff |
| 6,190,254 | B1 | 2/2001 | Bennett |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,213,876 | B1 | 4/2001 | Moore, Jr. |
| 6,224,482 | B1 | 5/2001 | Bennett |
| 6,224,483 | B1 * | 5/2001 | Mayeroff .................... 463/20 |
| 6,227,971 | B1 | 5/2001 | Weiss |
| 6,231,442 | B1 | 5/2001 | Mayeroff |
| 6,231,445 | B1 | 5/2001 | Acres |
| 6,234,879 | B1 | 5/2001 | Hasegawa et al. |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,251,013 | B1 | 6/2001 | Bennett |
| 6,261,128 | B1 | 7/2001 | Heim et al. |
| 6,261,177 | B1 | 7/2001 | Bennett |
| 6,299,165 | B1 | 10/2001 | Nagano |
| 6,302,790 | B1 | 10/2001 | Brossard |
| 6,305,686 | B1 | 10/2001 | Perrie et al. |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,664 | B1 | 11/2001 | Baerlocher et al. |
| 6,319,124 | B1 | 11/2001 | Baerlocher et al. |
| 6,322,309 | B1 | 11/2001 | Thomas et al. |
| 6,328,649 | B1 | 12/2001 | Randall et al. |
| 6,334,814 | B1 | 1/2002 | Adams |
| 6,336,860 | B1 | 1/2002 | Webb |
| 6,336,863 | B1 | 1/2002 | Baerlocher et al. |
| 6,340,158 | B2 | 1/2002 | Pierce et al. |
| 6,346,043 | B1 | 2/2002 | Colin et al. |
| 6,347,996 | B1 | 2/2002 | Gilmore et al. |
| 6,358,147 | B1 | 3/2002 | Jaffe et al. |
| 6,364,766 | B1 | 4/2002 | Anderson et al. |
| 6,364,767 | B1 | 4/2002 | Brossard et al. |
| 6,364,768 | B1 | 4/2002 | Acres et al. |
| 6,368,216 | B1 | 4/2002 | Hedrick et al. |
| 6,375,187 | B1 | 4/2002 | Baerlocher |
| 6,375,567 | B1 | 4/2002 | Acres |
| 6,375,570 | B1 | 4/2002 | Poole |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,413,160 | B1 | 7/2002 | Vancura |
| 6,416,408 | B2 | 7/2002 | Tracy et al. |
| 6,419,579 | B1 | 7/2002 | Bennett |
| 6,435,511 | B1 | 8/2002 | Vancura et al. |
| 6,439,993 | B1 | 8/2002 | O'Halloran |
| 6,443,452 | B1 | 9/2002 | Brune |
| 6,443,837 | B1 | 9/2002 | Jaffe et al. |
| 6,454,651 | B1 | 9/2002 | Yoseloff |
| 6,471,208 | B2 | 10/2002 | Yoseloff et al. |
| 6,481,713 | B2 | 11/2002 | Perrie et al. |
| 6,491,584 | B2 | 12/2002 | Graham et al. |

| | | | | |
|---|---|---|---|---|
| 6,494,454 | B2 | 12/2002 | Adams | |
| 6,506,118 | B1 | 1/2003 | Baerlocher et al. | |
| 6,514,141 | B1 | 2/2003 | Kaminkow et al. | |
| 6,537,150 | B1 | 3/2003 | Luciano et al. | |
| 6,561,904 | B2 | 5/2003 | Locke et al. | |
| 6,565,436 | B1 | 5/2003 | Baerlocher | |
| 6,607,438 | B2 * | 8/2003 | Baerlocher et al. | 463/16 |
| 6,609,972 | B2 | 8/2003 | Seelig et al. | |
| 6,632,141 | B2 * | 10/2003 | Webb et al. | 463/25 |
| 6,719,630 | B1 | 4/2004 | Seelig et al. | |
| 6,719,632 | B2 * | 4/2004 | Palmer et al. | 463/25 |
| 6,808,452 | B2 * | 10/2004 | Baerlocher et al. | 463/17 |
| 6,913,532 | B2 | 7/2005 | Baerlocher et al. | |
| 6,955,600 | B2 | 10/2005 | Glavich et al. | |
| 6,960,132 | B2 * | 11/2005 | Baerlocher et al. | 463/17 |
| 7,094,148 | B2 * | 8/2006 | Baerlocher et al. | 463/20 |
| 7,331,864 | B2 * | 2/2008 | Baerlocher | 463/20 |
| 7,331,866 | B2 * | 2/2008 | Rodgers et al. | 463/20 |
| 7,481,708 | B2 * | 1/2009 | Baerlocher et al. | 463/20 |
| 7,513,828 | B2 * | 4/2009 | Nguyen et al. | 463/26 |
| 2002/0155880 | A1 | 10/2002 | Glavich et al. | |
| 2003/0054875 | A1 | 3/2003 | Marks et al. | |
| 2003/0060272 | A1 | 3/2003 | Glavich et al. | |
| 2003/0073482 | A1 | 4/2003 | Baerlocher et al. | |
| 2003/0162585 | A1 | 8/2003 | Bigelow et al. | |
| 2004/0002372 | A1 | 1/2004 | Rodgers et al. | |
| 2004/0048649 | A1 | 3/2004 | Peterson et al. | |
| 2004/0048652 | A1 | 3/2004 | Ching et al. | |
| 2004/0053672 | A1 | 3/2004 | Baerlocher | |
| 2004/0072612 | A1 * | 4/2004 | Rodgers et al. | 463/20 |
| 2004/0137982 | A1 | 7/2004 | Cuddy et al. | |
| 2004/0147306 | A1 | 7/2004 | Randall et al. | |
| 2004/0171415 | A1 * | 9/2004 | Webb et al. | 463/16 |
| 2004/0180710 | A1 * | 9/2004 | Palmer et al. | 463/16 |
| 2005/0020346 | A1 * | 1/2005 | Baerlocher | 463/16 |
| 2005/0053672 | A1 | 3/2005 | West | |
| 2005/0054429 | A1 | 3/2005 | Baerlocher et al. | |
| 2005/0075163 | A1 | 4/2005 | Cuddy et al. | |
| 2005/0148384 | A1 * | 7/2005 | Marks et al. | 463/20 |
| 2005/0197180 | A1 | 9/2005 | Kaminkow et al. | |
| 2006/0094496 | A1 * | 5/2006 | Webb et al. | 463/20 |

FOREIGN PATENT DOCUMENTS

| | | | |
|---|---|---|---|
| AU | A-50327/96 | | 10/1997 |
| AU | A-63553/98 | | 10/1998 |
| DE | 3638100 | | 11/1988 |
| DE | 4301855 | | 7/1994 |
| DE | 19613455 | | 8/1997 |
| DE | 19936196 | | 1/2001 |
| EP | 0874337 | A1 | 10/1998 |
| EP | 0926645 | A2 | 6/1999 |
| EP | 0944030 | A2 | 9/1999 |
| EP | 0945837 | A2 | 9/1999 |
| EP | 0981119 | A2 | 2/2000 |
| EP | 0984408 | A2 | 3/2000 |
| EP | 0984409 | A2 | 8/2000 |
| EP | 0798676 | A1 | 1/2001 |
| WO | WO 97/32285 | | 9/1997 |
| WO | WO 00/12186 | | 3/2000 |
| WO | WO 01/26019 | | 4/2001 |

OTHER PUBLICATIONS

Big Bang Piggy Bankin Advertisement written by WMS Gaming, Inc., published prior to 2000.

Jackpot Party Brochures and Articles written by WMS Gaming, Inc., published in 1998.

Jazzy Jackpots Advertisement written by Atronic Casino Technology, Ltd., published in 2001.

Leopard Spots™ (website) written by www.igt.com, printed Mar. 21, 2001.

Money Grab Article written by Strictly Slots, published in Apr. 2001.

Money in the Bank Advertisement written by Strictly Slots Konami, published in 2001.

Monopoly Brochures and Articles written by WMS Gaming Inc., published in 1998, 1999, and 2000.

Monopoly Party Train Article written by Strictly Slots, published in 2002.

On the Money Article written by Strictly Slots, Casino Data Systems, published in Dec. 2000.

Slot Machines written by Marshall Fey, printed 1983, 1989, 1991, 1994 and 1997.

X Factor Advertisement and Website Page written by WMS Gaming, Inc., published in 1998.

* cited by examiner

GAMING DEVICE HAVING FREE SPIN GAME WITH TERMINATORS AND ANTI-TERMINATORS

PRIORITY CLAIM

This application is a non-provisional application of, claims priority to and the benefit of U.S. Provisional Patent Application Ser. No. 60/611,823, filed on Sep. 21, 2004, which is incorporated herein in its entirety.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming machines or devices provide games, such as slot games, wherein a player has one or more opportunities to obtain a winning symbol combination on mechanical or video reels. In these gaming devices, the player initiates the spin of the reels by making a wager and the positions of the reels after they stop, determines whether a player wins a value and, if so, how much value the player wins. These gaming machines typically have certain features designated for outcomes such as when a player wins a value, when the player advances to a bonus game or when the game terminates. For example, these gaming machines often display the amount of credits earned, flash lights, make sounds or have other features designed to draw attention to the outcome and entertain the player.

Gaming devices having bonus or secondary games generally employ a triggering event that occurs during the base or primary game. Certain known gaming devices have one or more bonus or secondary free spin mode or sequences which are provided to the player after the triggering event in the primary game. The triggering event temporarily halts the primary game play and enables a player to enter the free spin mode or sequence wherein one or more free spins are provided to the player. The player plays the free spin mode or sequence, likely receives an award during one or more of the free spins and returns to the base game. Free spin mode or sequences that provide players with large awards or the potential to win large awards are attractive to players.

Known gaming devices utilize a plurality of free games with a retrigger feature, such as the gaming device disclosed in U.S. Pat. No. 6,491,584 B2. The gaming device disclosed therein provides a base game and an initial series of free games provided to a player when a trigger condition occurs in the base game. An initial bonus feature is associated with the initial series of free games. In this gaming device, if the same trigger condition occurs in the initial series of free games, the gaming device provides a subsequent series of free games to the player. The subsequent series of free games has a different bonus feature. Accordingly, the bonus feature applicable to the subsequent series of free games is applied to any remaining games of the initial series of free games as well as to the games of the subsequent series of free games.

Other known gaming devices also utilize terminators, such as the gaming device disclosed in European Patent No. EP 09454837A2. In the gaming device disclosed therein, the gaming device provides a plurality of selections in a bonus game. The selections include masked or hidden awards and terminators. The player receives an award for each selection picked by the player that is not a terminator. The player continues to pick selections until the player obtains a terminator. The terminator ends the bonus game and the player receives the total of all the awards they obtained during the bonus game.

Other known gaming devices, such as the gaming device disclosed in U.S. Pat. No. 6,190,255 B1 utilize anti-terminators. In the gaming device disclosed therein, upon a specific symbol combination in the basic mode, the gaming device generates an anti-terminator which is subsequently exercisable in a bonus game of the gaming device. Until the gaming device activates the bonus mode, the player may continue obtaining anti-terminators in the basic mode. In the bonus mode, a player may use an anti-terminator to override an otherwise undesired outcome of the bonus game. For example, if in the bonus mode the player obtained an outcome that would end the bonus mode, an anti-terminator, if available, may be used to override the end bonus mode outcome and thereby continue play of the bonus mode.

Another known gaming device, such as the gaming device described in U.S. Pat. No. 6,632,141, which is assigned to the assignee of this application, discloses a game that provides a plurality of player selectable selections wherein each selection has an associated offer, anti-terminator or terminator. The gaming device enables the player to pick the selections one at a time. If an offer is associated with the picked selection, the player may accept or reject the offer. If the player accepts the offer, the accepted offer is provided to the player and the game ends. If the player rejects the offer, the player is enabled to pick another selection. If an anti-terminator is associated with the picked selection, the anti-terminator is retained or accumulated for subsequent use. If a terminator is associated with the picked selection, the game ends unless at least one anti-terminator is previously retained. The previously retained anti-terminator nullifies the effect of the terminator and allows the game to continue. The game continues until either the player accepts an offer or a picked selection is associated with a terminator and no anti-terminators are retained.

It should be appreciated that free spin games as well as games with terminators and anti-terminators may substantially elevate award returns and increase player excitement and enjoyment. Players enjoy playing for extended periods of time and high bonus awards. Therefore, it is desirable to provide new exciting games to a player.

SUMMARY OF THE INVENTION

The present invention relates in general to a gaming device, and more particularly to a gaming device having a primary game operable upon a wager and a free spin mode or sequence with terminators and anti-terminators. In one embodiment, each free spin mode is a repeat of the primary game without the requirement of a wager. The gaming device includes a plurality of symbol generators with a plurality of symbols on or associated with each symbol generator. In one embodiment, the symbol generators are reels with a plurality of symbols on each of the reels. At least one and preferably a plurality of the symbols on the reels are designated as terminator symbols. A terminator symbol is a symbol that, when generated on one of the reels, causes the termination of the free spin mode. Additionally, at least one and preferably a plurality of the symbols on the reels are designated as anti-terminator symbols. An anti-terminator symbol is a symbol that, when generated on one of the reels, nullifies the terminating effect of one or more subsequently generated terminator symbols.

In one embodiment of the present invention, upon a suitable triggering event, a free spin mode or sequence is initiated. The free spin mode provides the player at least one and preferably a plurality of free spins or free activations of the reels. Upon the initiation of the free spin mode, the plurality of reels generate a plurality of symbols and the gaming device determines if an award is associated with any of the generated symbols or symbol combinations. If an award is associated with any of the generated symbols or symbol combinations, the determined award is provided to the player.

In addition to determining any award based on the generated symbols, the gaming device also determines if at least one terminator symbol or at least one anti-terminator symbol is generated. If at least one anti-terminator symbol is generated, the generated anti-terminator symbol is retained or accumulated for subsequent use and the free spin mode continues. If the number of generated terminators is greater than the number of retained anti-terminators, if any, the free spin mode ends. If the number of generated terminators is not greater than the number of retained anti-terminators, the retained anti-terminator symbol is utilized to nullify the free spin ending effect of the terminator symbol and the free spin mode continues.

If the free spin mode or sequence continues (i.e., no terminator symbol was generated or any generated terminator symbol was nullified by one or more previously retained anti-terminators), the reels are caused to generate another plurality of symbols. Again, the gaming device determines any award based on the generated symbols as well as determining if any terminator symbol or anti-terminator symbol is generated. The gaming device proceeds as described above until at least one terminator symbol is generated and there are no retained anti-terminator symbols to nullify the effect of the generated terminator symbol.

The present invention therefore provides a free spin mode wherein the gaming device enables a player to retain at least one anti-terminator to nullify the effects of a subsequently obtained terminator. Providing a free spin mode or sequence with terminators and anti-terminators increases the player's level of excitement and entertainment.

Additional features and advantages of the present invention are described in, and will be apparent from, the following Detailed Description of the Invention and the figures.

DETAILED DESCRIPTION

Figure 1A:
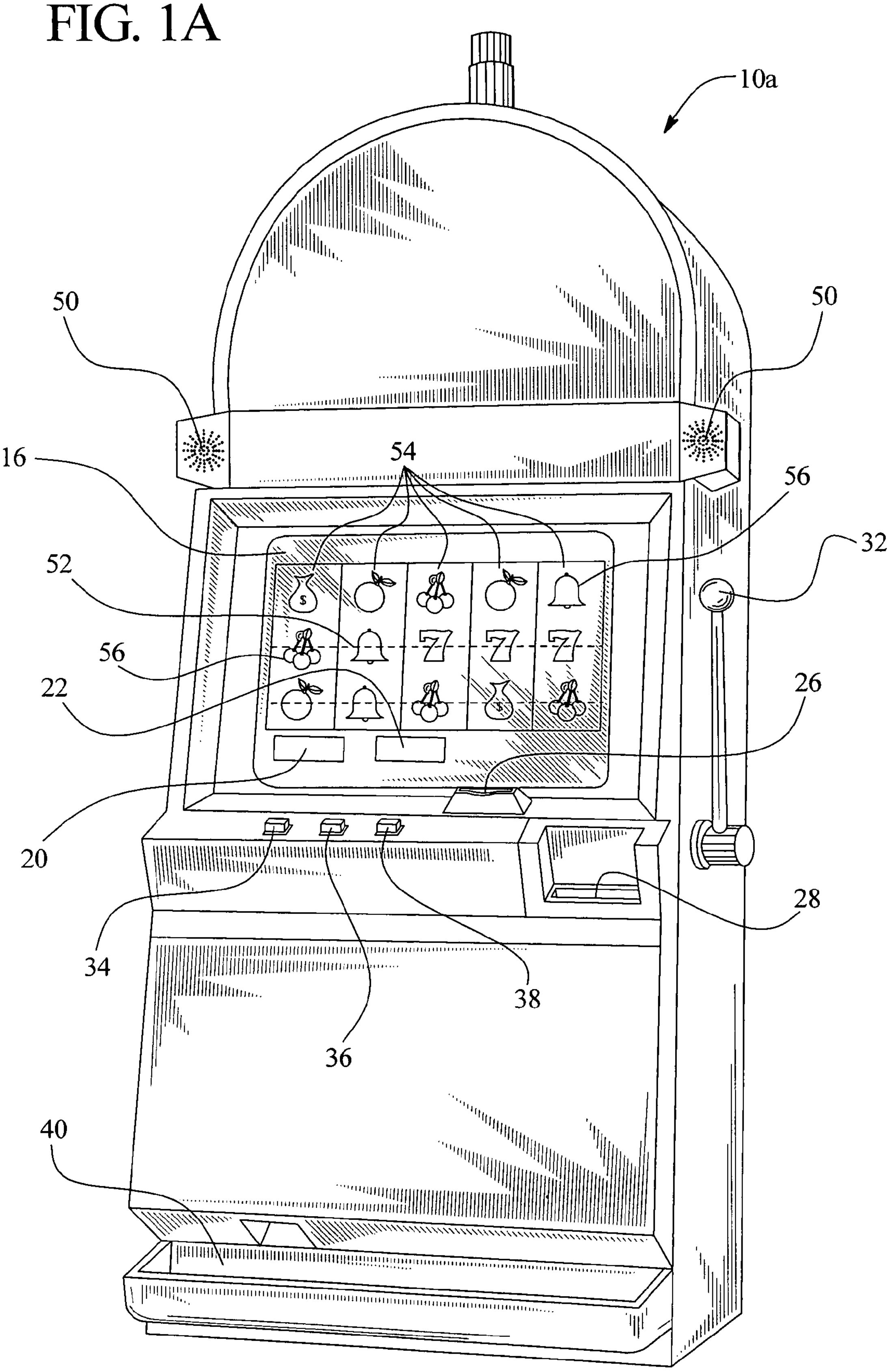
FIG. 1A is a front-side perspective view of one embodiment of the gaming device of the present invention.
Figure 1B:
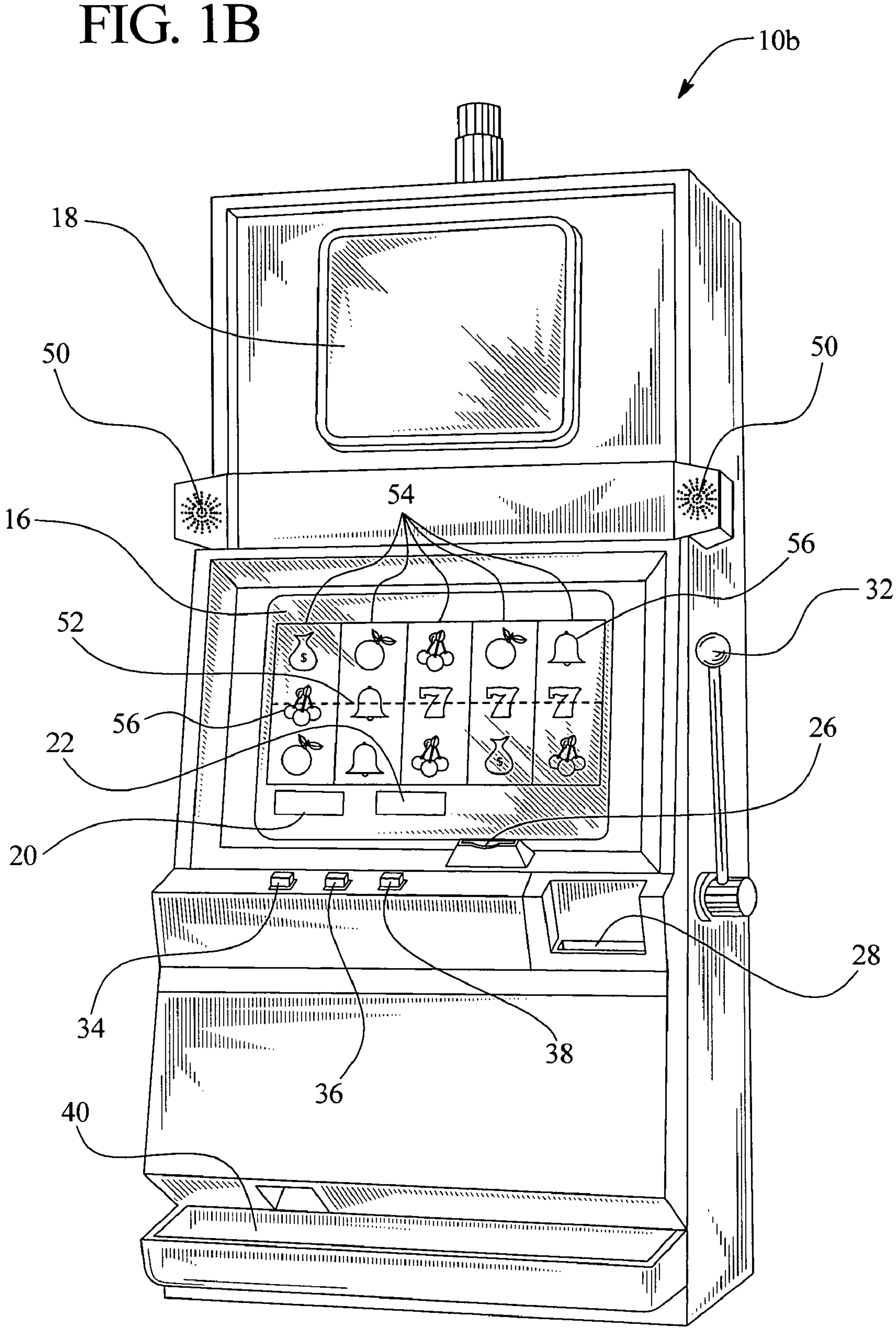
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
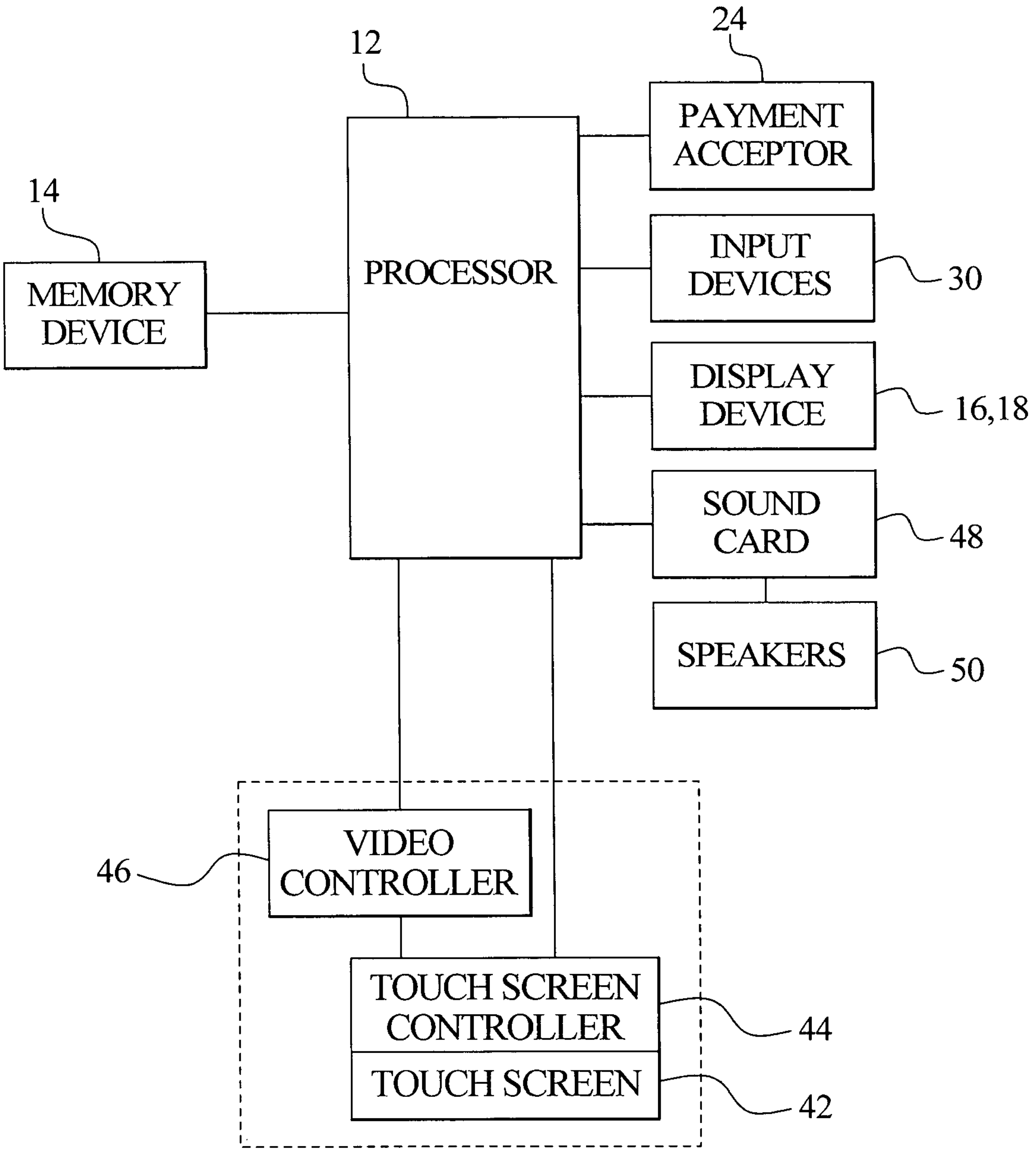
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
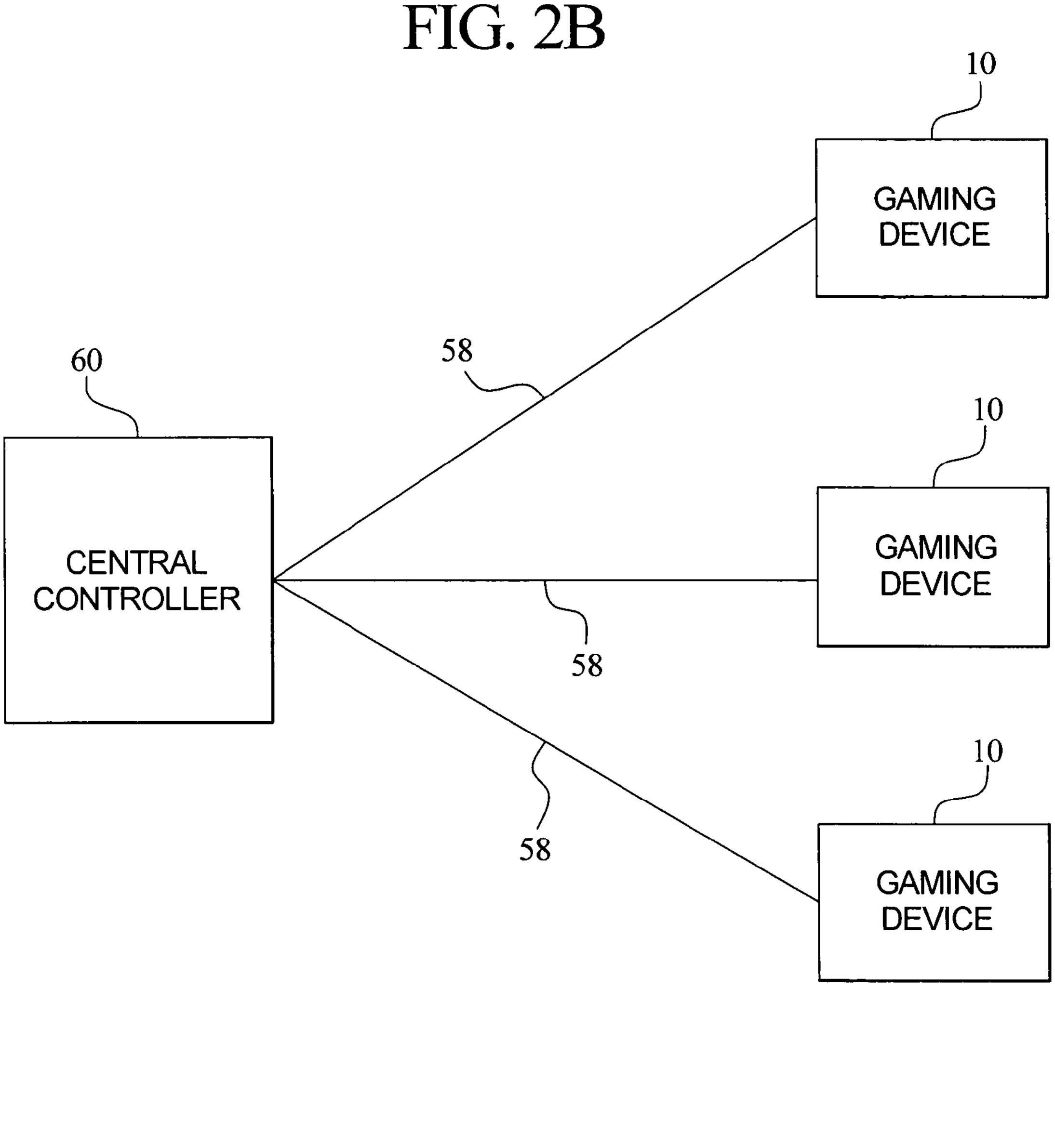
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 60. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

The reel or slot game of the present invention can be provided to the player as a primary or base game or as a secondary or bonus game. If the reel or slot game is provided as a secondary game, then the gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, a base or primary game may be a poker game wherein the gaming device enables the player to play a conventional game of video poker and initially deals five cards all face up from a virtual deck of fifty-two cards. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

If the reel game of the present invention is incorporated as a primary or base game, then in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Regardless of if the reel or slot game is incorporated as a primary or base game or as a secondary or bonus game, the reel or slot game includes one or more paylines 52 as illustrated in FIGS. 1A and 1B. The paylines may be horizontal, vertical, circular, diagonal, angled or any combination thereof. In one embodiment, the gaming device displays at least one and preferably a plurality of symbol generators or reels 54, such as the five reels illustrated in FIGS. 1A and 1B. The symbol generators or reels are in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In one embodiment, if the reels are in video form, the plurality of simulated video reels are displayed on one or more of the display devices as described above. Each reel displays a plurality of indicia or symbols 56 such as bells, hearts, fruits, numbers, letters, bars or other images which preferably correspond to one or more themes associated with the gaming device.

Free Spin Sequence with Terminators and Anti-Terminators

Figure 3A:
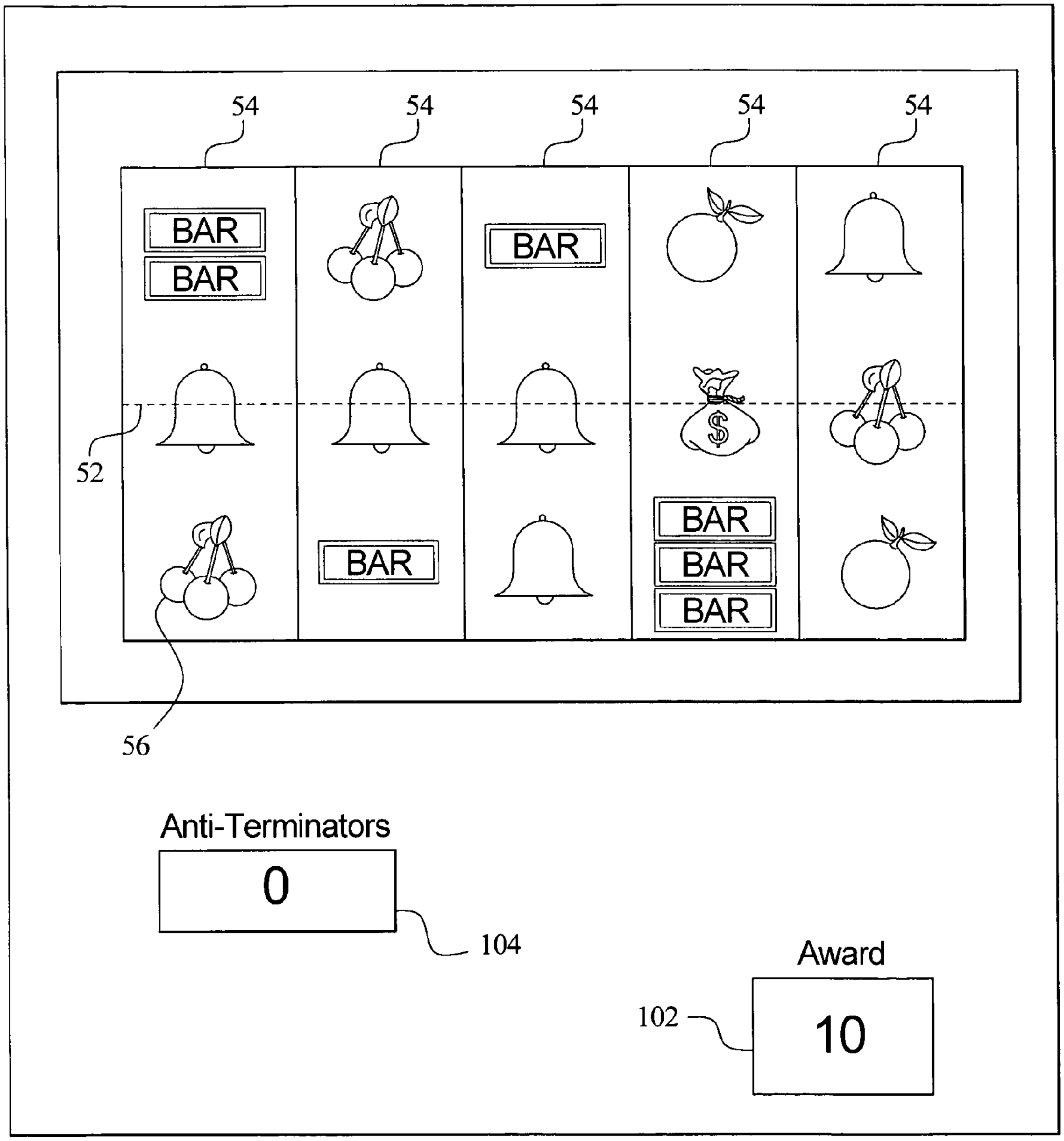
FIGS. 3A, 3B, 3C, 3D, 3E and 3F are front elevational views of one embodiment of the present invention, illustrating a free spin mode or sequence with at least one terminator symbol, at least one anti-terminator symbol and an award provided to a player based on a plurality of spins of the reels.

Referring now to FIG. 3A, upon a suitable triggering event, such as a designated symbol or symbol combination generated on the reels of a primary reel game, the gaming device provides the player a free spin reel game. In one embodiment, the free spin mode or sequence includes at least one and preferably a number of free spins or free activations of the plurality of reels. The plurality of reels include a plurality of symbols including at least one terminator symbol and at least one anti-terminator symbol. As described below, a terminator symbol is a symbol that, when generated on one of the reels, causes the termination of the free spin mode and an anti-terminator symbol is a symbol that, when generated on one of the reels, nullifies the terminating effect of a subsequently generated terminator symbol.

In one embodiment, the gaming device includes at least one symbol designated as a terminator symbol. In another embodiment, the gaming device includes a plurality of symbols designated as terminators symbols. In one embodiment, a plurality of the reels each include at least one symbol designated as a terminator symbol. In another embodiment, a plurality of the reels each include a plurality of symbols designated as terminator symbols. In another embodiment, each of the reels includes at least one symbol designated as a terminator symbol. In another embodiment, each of the reels includes a plurality of symbols designated as terminator symbols.

In one embodiment, the number of symbols designated as terminator symbols on the reels is predetermined, randomly determined, determined based on the player's wager in a primary game, determined from the occurrence of one or more symbols in a primary game or determined based on any other suitable method. In one embodiment, the location of each symbol designated as a terminator symbol is predetermined, randomly determined, determined based on the player's wager in a primary game, determined from the occurrence of one or more symbols in a primary game or determined based on any other suitable method.

In one embodiment, the gaming device includes at least one symbol designated as an anti-terminator symbol. In another embodiment, the gaming device includes a plurality of symbols designated as anti-terminator symbols. In one embodiment, a plurality of the reels each include at least one symbol designated as an anti-terminator symbol. In another embodiment, a plurality of the reels each include a plurality of symbols designated as anti-terminator symbols. In another embodiment, each of the reels includes at least one symbol designated as an anti-terminator symbol. In another embodiment, each of the reels includes a plurality of symbols designated as anti-terminator symbols.

In one embodiment, the number of symbols designated as anti-terminator symbols on the reels is predetermined, randomly determined, determined based on the player's wager in a primary game, determined from the occurrence of one or more symbols in a primary game or determined based on any other suitable method. In one embodiment, the location of each symbol designated as an anti-terminator symbol is predetermined, randomly determined, determined based on the player's wager in a primary game, determined from the occurrence of one or more symbols in a primary game or determined based on any other suitable method.

In one embodiment, the number of terminator symbols on the plurality of reels is the same as the number of anti-terminator symbols on the plurality of reels. In another embodiment, the number of terminator symbols on the plurality of reels is different than the number of anti-terminator symbols on the plurality of reels. In one embodiment, at least one reel has the same number of terminator symbols as anti-terminator symbols. In another embodiment, at least one reel has a different number of terminator symbols than anti-terminator symbols. In one embodiment, a plurality of the reels each have the same number of terminator symbols as anti-terminator symbols. In another embodiment, a plurality of the reels each have a different number of terminator symbols than anti-terminator symbols. In one embodiment, each of the reels has the same number of terminator symbols as anti-terminator symbols. In another embodiment, each of the reels has a different number of terminator symbols than anti-terminator symbols.

As illustrated in FIG. 3A, upon a suitable triggering event, such as a designated symbol or symbol combination generated on the reels of a primary reel game, the free spin mode is initiated and the reels are activated to generate a plurality of symbols 56. The gaming device determines any suitable award associated with any symbol or symbol combination generated on an active payline 52 of the reels. If an award is associated with any of the generated symbols or symbol combinations, the determined award is provided to the player. For example, as seen in FIG. 3A, the gaming device determines that an award of ten is associated with the symbol combination of three adjacent bell symbols on the active payline. Accordingly, the determined award of ten is provided to the player as displayed in the award display 102.

In addition to determining any award based on the generated symbols, the gaming device also determines if at least one terminator symbol and/or at least one anti-terminator symbol is generated on the reels. If no terminator symbols are generated on the reels, the free spin mode continues with another generation of symbols on the reels. In this example, no terminator symbols or anti-terminator symbols were generated on the reels and thus the free spin mode continues.

Figure 3B:
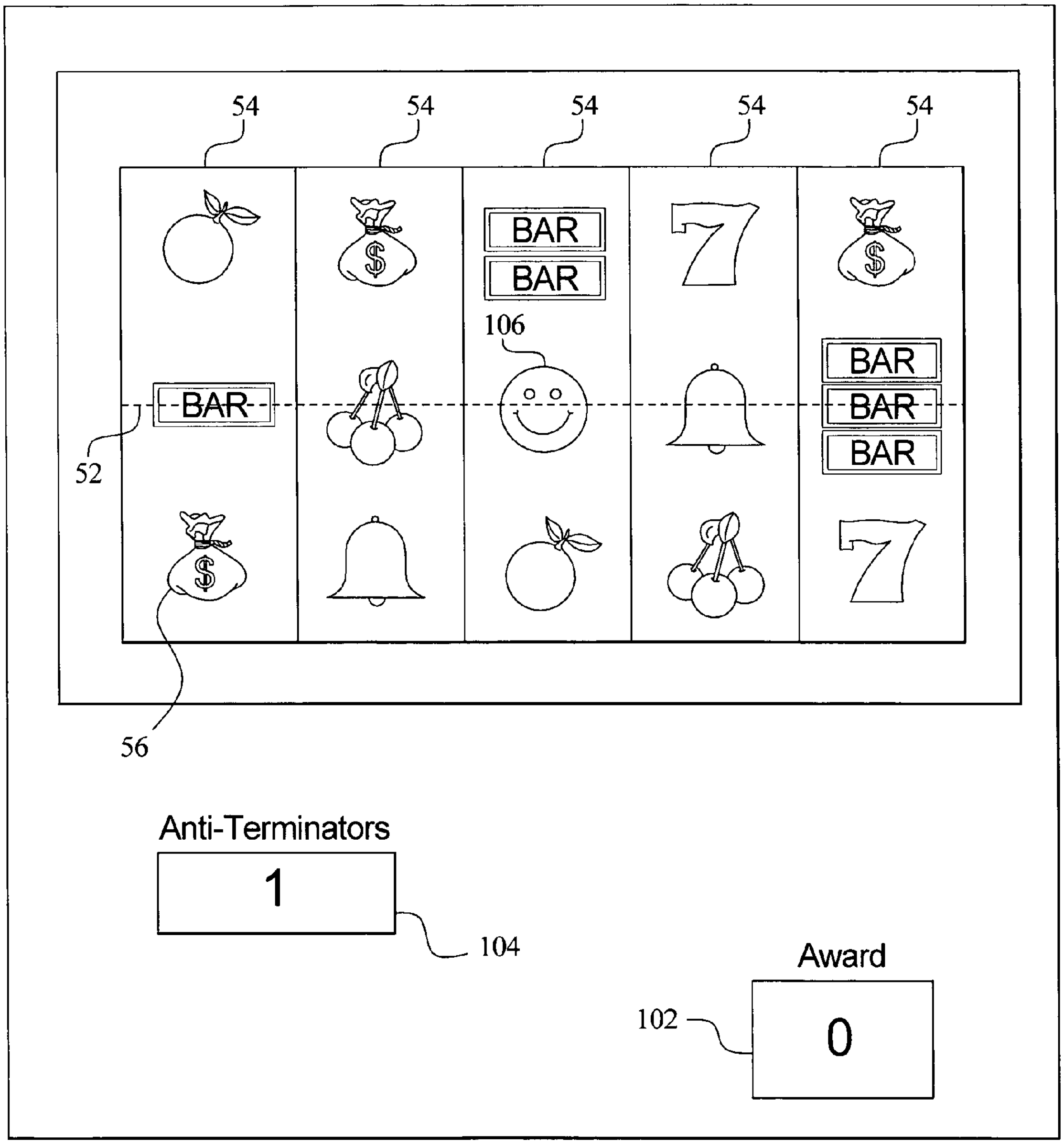

As illustrated in FIG. 3B, the free spin mode or sequence continues and the gaming device causes another plurality of symbols to be generated on the reels. As described above, the gaming device determines if any award should be provided based on the generated symbols. In this example, as indicated in the award display, no award is provided to the player based on the generated symbols. The gaming device also determines if at least one terminator symbol and/or at least one anti-terminator symbol are generated on the reels. In this example, the gaming device generated an anti-terminator symbol 106 on the reels. Accordingly, the anti-terminator symbol or anti-terminator is retained or accumulated to be subsequently utilized to nullify a subsequently generated terminator symbol on another spin or activation of the reels as described below. The retained anti-terminator is displayed in an anti-terminator display 104 which is adapted to display the number of any retained anti-terminators. As no terminator symbol was generated, the free spin mode continues with another generation of symbols on the reels.

Figure 3C:
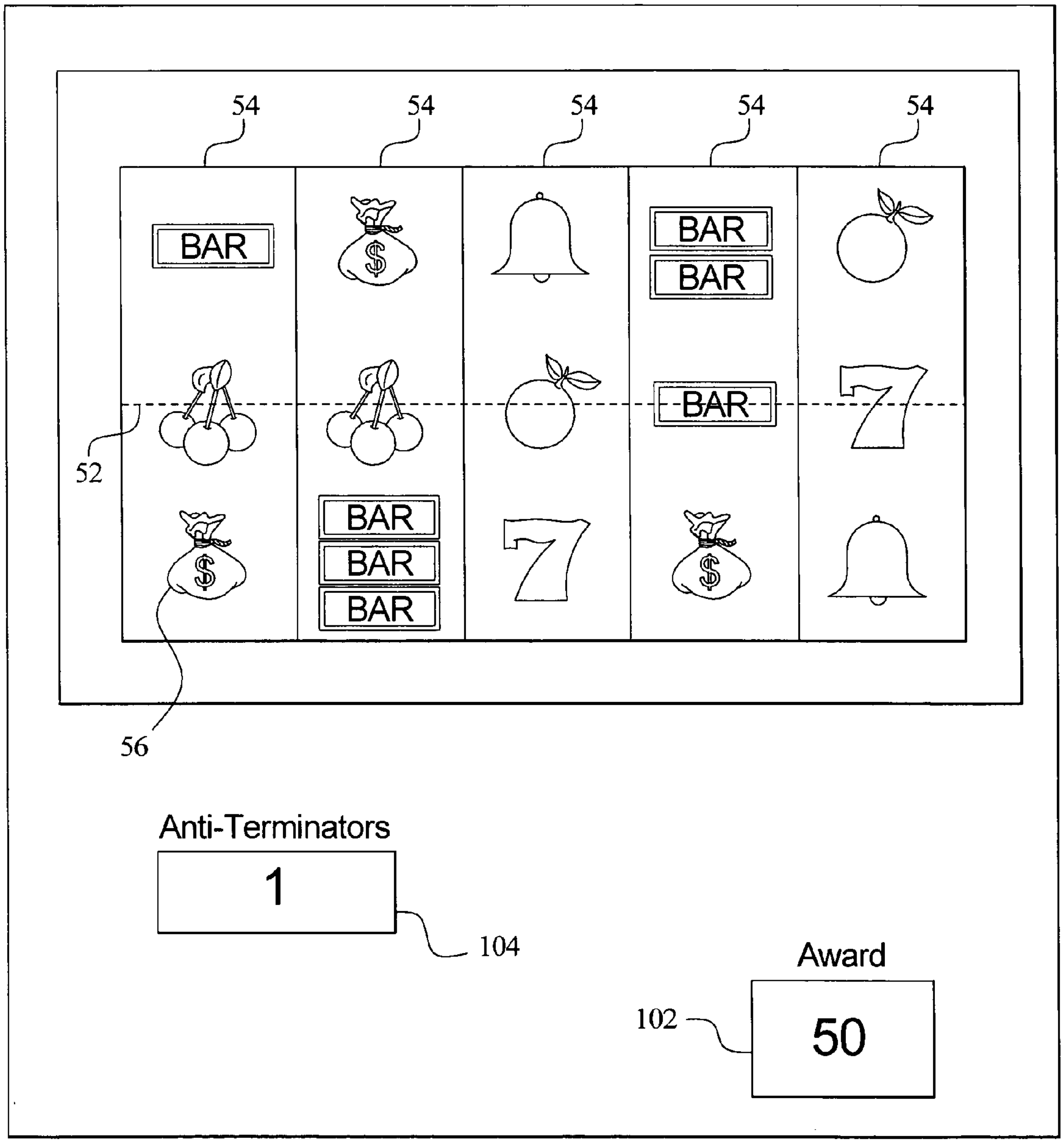

As illustrated in FIG. 3C, the free spin mode continues and the gaming device causes another plurality of symbols to be generated on the reels. As described above, the gaming device determines if any award should be provided based on the generated symbols. In this example, the gaming device determines that an award of fifty is associated with the symbol combination of two adjacent cherry symbols on the active payline and as indicated in the award display, an award of fifty is provided to the player based on the generated symbols. The gaming device also determines if at least one terminator symbol and/or at least one anti-terminator symbol are generated on the reels. As no terminator symbols or anti-terminator symbols are generated on the reels, the free spin mode continues.

Figure 3D:
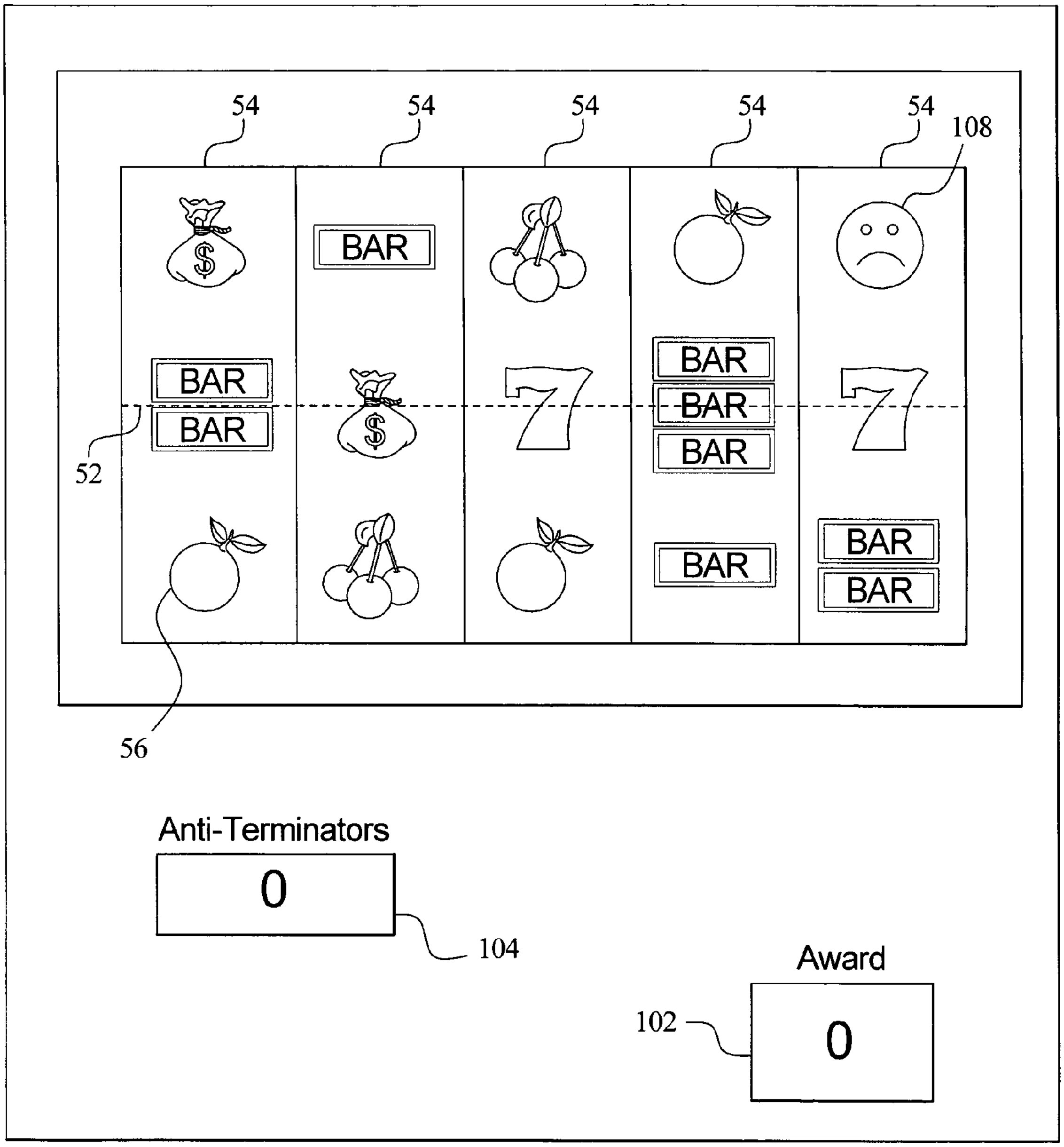

As illustrated in FIG. 3D, the free spin mode continues and the gaming device causes another plurality of symbols to be generated on the reels. The gaming device determines if any award should be provided based on the generated symbols. In this example, as indicated in the award display, no award is provided to the player based on the generated symbols. The gaming device also determines if at least one terminator symbol and/or at least one anti-terminator symbol are generated on the reels. In this example, the gaming device generated an terminator symbol 108 on the reels.

In one embodiment, if a terminator symbol is generated, the gaming device determines if any anti-terminators are retained from any previous activations of the reels. If the number of generated terminators is greater than the number of retained anti-terminators, if any, the free spin mode ends. If the number of generated terminators is not greater than the number of retained anti-terminators, the retained anti-terminator symbol is utilized to nullify the free spin ending effect of the terminator symbol and the free spin mode continues. In this example, the retained anti-terminator nullifies the free spin ending effect of the generated terminator symbol and the game continues. It should be appreciated that after the retained anti-terminator is used to nullify the generated terminator, no anti-terminators remain as indicated by the anti-terminator display.

Figure 3E:
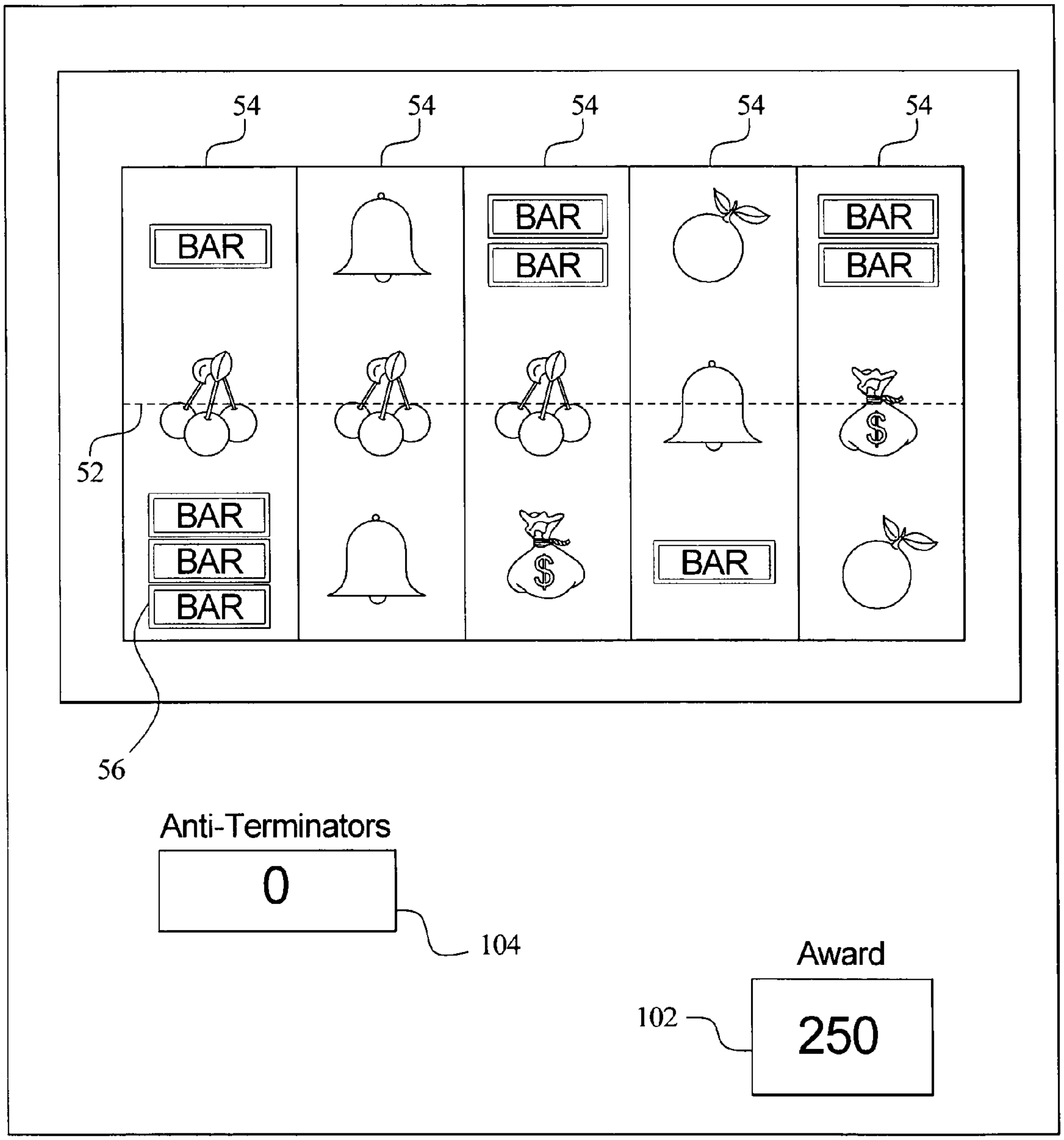

As illustrated in FIG. 3E, the free spin mode continues and the gaming device causes another plurality of symbols to be generated on the reels. As described above, the gaming device determines if any award should be provided based on the generated symbols. In this example, the gaming device determines that an award of two-hundred-fifty is associated with the symbol combination of three adjacent cherry symbols on the active payline. As indicated in the award display, an award of two-hundred-fifty is provided to the player based on the generated symbols. The gaming device also determines if at least one terminator symbol and/or at least one anti-terminator symbol are generated on the reels. As no terminator symbols or anti-terminator symbols are generated on the reels the free spin mode continues. It should be appreciated that, in this example, without any retained anti-terminators, the terminator generated from the previous reel generation would have ended the free spin mode and the player would not be subsequently provided the large award of two-hundred-fifty.

Figure 3F:
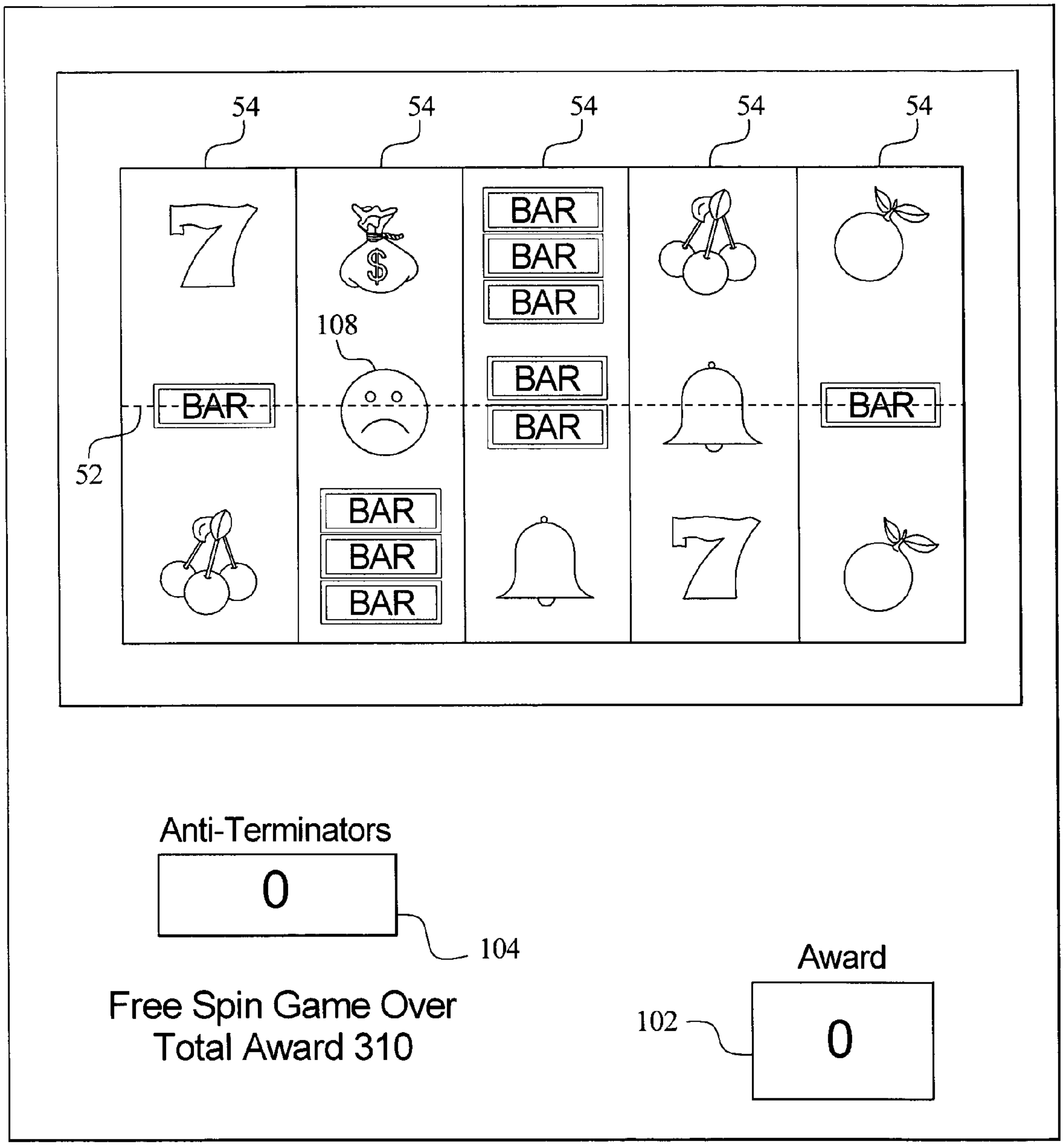

As illustrated in FIG. 3F, the free spin mode continues and the gaming device causes another plurality of symbols to be generated on the reels. The gaming device determines if any award should be provided based on the generated symbols. In this example, as indicated in the award display, no award is provided to the player based on the generated symbols. The gaming device also determines if at least one terminator symbol and/or at least one anti-terminator symbol are generated on the reels. In this example, the gaming device generated an terminator symbol 108 on the reels. In this example, as a terminator symbol is generated and no anti-terminator symbols are retained, the free spin mode ends. Appropriate messages such as "FREE SPIN GAME OVER," and "TOTAL AWARD 310" are preferably provided to the player visually, or through suitable audio or audiovisual displays.

In one embodiment, in addition to the free spin mode or sequence ending if a non-nullified terminator is generated, the free spin mode may end after a number of free spins or activations of the reels. In different embodiments, the number of free spins or activations of the reels is predetermined, randomly determined, determined based on the player's wager in a primary game, determined from the occurrence of one or more symbols in a primary game or determined based on any other suitable method. In another embodiment, in addition to the free spin mode ending if a non-nullified terminator is generated, the free spin mode may end when the awards provided to the player reach a limit. In different embodiments, the limit of the amount of awards which may be provided to the player is predetermined, randomly determined, determined based on the player's wager in a primary game, determined from the occurrence of one or more symbols in a primary game or determined based on any other suitable method.

In one embodiment, the terminator symbol must be generated on an active payline of the reels to cause the termination of the free spin mode as described below. In another embodiment, the terminator symbol must be generated on the reels but not necessarily on an active payline to terminate the free spin mode. In one embodiment, the anti-terminator symbol must be generated on an active payline of the reels to be retained as described below. In another embodiment, the anti-terminator symbol must be generated on the reels but not necessarily on an active payline to be retained.

In one embodiment, as illustrated above, each retained anti-terminator symbol may nullify the effects of any generated terminator symbol. In another embodiment, at least one anti-terminator symbol may nullify the effects of a designated generated terminator symbol. That is, at least one anti-terminator symbol is associated with at least one terminator symbol and the anti-terminator symbol can only nullify its associated terminator symbol. For example, if an anti-terminator symbol is retained and a terminator symbol is subsequently generated on the reels, unless the retained anti-terminator symbol is associated with the generated terminator symbol, the anti-terminator symbol will not nullify the effects of the terminator symbol and the free spin mode ends. In another embodiment, each anti-terminator symbol is operable to only nullify any terminator symbol that is generated on the same reel which that anti-terminator symbol was generated on. For example, if an anti-terminator symbol is generated on the third reel, the generated anti-terminator symbol is retained and operable to only nullify the effect of a terminator symbol also generated on the third reel. In this example, if a terminator symbol is subsequently generated on the first reel, then even though an anti-terminator is retained, since the anti-terminator was generated on the third reel and the terminator was generated on the first reel, the free spin mode ends.

In another embodiment, each reel is individually terminated based upon the occurrence of a non-nullified terminator symbol on that reel. In this embodiment, as each reel is individually terminated, the gaming device determines if a designated number of reels remains active (i.e., the designated number of reels are not terminated). If the designated number of reels are not active, the free spin mode ends. If the designated number of reels remains active, the free spin mode continues with at least one generation of symbols on each of the active reels until the designated number of reels are no longer active (i.e., until a plurality or each of the reels are individually terminated). For example, if a terminator symbol is generated on the second reel (and the generated terminator symbol is not nullified by at least one retained anti-terminator symbol), the second reel is terminated. The terminated second reel will not generate any symbols for each subsequent free spin or activation as the free spin mode continues.

In one embodiment, if a terminator symbol is generated on the reels, any award associated with the combination of generated symbols is not provided to the player. In another embodiment, if an anti-terminator symbol is generated on the reels, any award associated with the combination of generated symbols is not provided to the player. In another embodiment, if an anti-terminator symbol is generated on the reels, the generated anti-terminator symbol functions as a modifier of any award associated with the combination of generated symbols. In another embodiment, any generated terminator symbol and/or any generated anti-terminator symbol functions as a wild symbol. That is, a generated terminator symbol and/or a generated anti-terminator symbol is adapted to substitute for one of the plurality of symbols generated on the reels to form a different symbol combination than initially generated.

In one embodiment, a plurality of non-nullified terminator symbols must be obtained to cause the termination of the free spin mode. For example, two terminator symbols must be generated and non-nullified by any retained anti-terminator symbols to cause the termination of the free spin mode. In one embodiment, at least one and preferably a plurality of the anti-terminator symbols will cause the gaming device to retain a plurality of anti-terminator symbols. For example, if an anti-terminator symbol which is associated with three anti-terminators is generated on the reels, then the gaming device retains three anti-terminators to be utilized to nullify the terminating effect of three subsequently generated terminator symbols. In another embodiment, at least one and preferably a plurality of terminator symbols will each require a plurality of retained anti-terminators in order to nullify the free spin mode ending effect of that terminator symbol. For example, if the reels generate a terminator symbol which requires three retained anti-terminators to nullify the generated terminator, then unless three anti-terminators are previously retained, the generated terminator will terminate the free spin mode. That is, in this example, even if the player has one or two retained anti-terminators, the generation of a particular terminator symbol will still cause the termination of the free spin mode.

In another embodiment, the present invention is implemented as at least one and preferably a plurality of free cards games. In this embodiment, as described above, the player is provided a plurality of free card games until at least one terminator card is provided to the player and at least one anti-terminator card is not retained to nullify the terminating effects of the provided terminator card.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) display a play of a primary game upon a wager by a player;

(b) upon a triggering event, initiate a free spin mode of a secondary game, said secondary game associated with a plurality of symbols including at least one terminator symbol and at least one anti-terminator symbol, a plurality of reels associated with the secondary game, each of said plurality of reels including a plurality of said symbols; and (c) in said free spin mode of the secondary game:

(i) cause the reels to generate a plurality of said symbols;

(ii) determine if said generated symbols form a winning symbol combination;

(iii) provide the player any award associated with any determined winning symbol combination;

(iv) determine whether any of said terminator symbols or any of said anti-terminator symbols are generated on said reels;

(v) if at least one of said anti-terminator symbols is generated, retain said anti-terminator symbol;

(vi) if at least one of said terminator symbols is generated and the number of terminator symbols generated is less than the number of any retained anti-terminator symbols, apply said retained anti-terminator symbols to nullify said generated terminator symbol, wherein at least one retained anti-terminator symbol can be applied to at least one terminator symbol;

(vii) if at least one of said terminator symbols is generated and the number of terminator symbols generated is greater than the number of any retained anti-terminator symbols, perform a terminating event of the free spin mode; and (viii) repeat (i) to (vii) at least once if the terminating event of the free spin mode is not performed.

2. The gaming device of claim 1, wherein said plurality of symbols includes a plurality of terminator symbols.

3. The gaming device of claim 2, wherein the plurality of instructions, when executed by the at least one processor, cause the at least one processor to perform said terminating event if a designated plurality of terminator symbols are generated.

4. The gaming device of claim 1, wherein said plurality of symbols includes a plurality of anti-terminator symbols.

5. The gaming device of claim 1, wherein the plurality of instructions, when executed by the at least one processor, cause the at least one processor to repeat (i) to (vii) until the terminating event is performed.

6. The gaming device of claim 1, wherein the plurality of instructions, when executed by the at least one processor, cause the at least one processor to repeat (i) to (vii) a plurality of times or until the terminating event is performed.

7. The gaming device of claim 1, wherein at least one anti-terminator symbol is associated with a plurality of anti-terminators.

8. The gaming device of claim 1, wherein the plurality of instructions, when executed by the at least one processor, cause the at least one processor to provide the player a supplemental award if said anti-terminator is generated.

9. The gaming device of claim 1, wherein at least one anti-terminator symbol is a wild symbol.

10. The gaming device of claim 1, wherein the triggering event occurs in the primary game.

11. The gaming device of claim 1, wherein the plurality of reels are associated with the primary game.

12. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) display a play of a primary game upon a wager by a player;

(b) upon a triggering event, initiate a play of a secondary game including a plurality of symbols, wherein said plurality of symbols includes at least one terminator symbol and at least one anti-terminator symbol, a plurality of reels associated with the secondary game, wherein each of said plurality of reels includes a plurality of said symbols; and (c) in said play of the secondary game:

(i) cause the reels to generate a plurality of said symbols;

(ii) determine if said generated symbols form a winning symbol combination;

(iii) provide the player any award associated with any determined winning symbol combination;

(iv) determine whether any of said terminator symbols or said anti-terminator symbols are generated on said reels;

(v) accumulate any of said terminator symbols and said anti-terminator symbols determined to have been generated;

(vi) determine a value formed from subtracting any accumulated anti-terminator symbols from any accumulated terminator symbols, wherein if said value is at least equal to a predetermined value, said play of the secondary game is terminated; and (vii) repeat (i) to (vi) at least once if said play of the secondary game is not terminated.

13. The gaming device of claim 12, wherein the plurality of instructions, when executed by the at least one processor, cause the at least one processor to accumulate said terminator symbols and said anti-terminator symbols over multiple generations of said symbols.

14. The gaming device of claim 12, wherein the triggering event occurs in the primary game.

15. The gaming device of claim 12, wherein the plurality of reels are associated with the primary game.

16. A method of operating a gaming device including a plurality of instructions, said method comprising:

(a) causing at least one processor to execute said plurality of instructions to cause a plurality of reels generate a plurality of symbols in a free spin mode, wherein said generated symbols are selected from a plurality of symbols including at least one terminator symbol and at least one anti-terminator symbol;

(b) causing the at least one processor to execute said plurality of instructions to determine if said generated symbols form a winning symbol combination;

(c) providing a player any award associated with any determined winning symbol combination;

(d) causing the at least one processor to execute said plurality of instructions to determine whether any terminator symbols or any anti-terminator symbols are generated on said reels;

(e) if at least one of said anti-terminator symbols is generated, causing the at least one processor to execute said plurality of instructions to retain said anti-terminator symbol;

(f) if at least one of said terminator symbols is generated and, the number of terminator symbols generated is less than the number of any retained anti-terminator symbols, causing the at least one processor to execute said plurality of instructions to apply said retained anti-terminator symbols to nullify said generated terminator symbol, wherein at least one retained anti-terminator symbol can be applied to at least one terminator symbol;

(g) if at least one of said terminator symbols is generated and the number of terminator symbols generated is greater than the number of any retained anti-terminator symbols, causing the at least one processor to execute said plurality of instructions to perform a terminating event of the free spin mode; and (h) repeating (a) to (g) at least once if the terminating event of the free spin mode is not performed.

17. The method of claim 16, wherein said plurality of symbols includes a plurality of terminator symbols.

18. The method of claim 17, which includes causing the at least one processor to execute said plurality of instructions to perform said terminating event if a plurality of terminator symbols are generated.

19. The method of claim 16, wherein said plurality of symbols includes a plurality of anti-terminator symbols.

20. The method of claim 16, which includes repeating steps (a) to (g) until the terminating event is performed.

21. The method of claim 16, which includes repeating steps (a) to (g) a plurality of times or until the terminating event is performed.

22. The method of claim 16, wherein at least one anti-terminator symbol is associated with a plurality of anti-terminators.

23. The method of claim 16, which includes providing the player a supplemental award if said anti-terminator is generated.

24. The method of claim 16, wherein at least one anti-terminator symbol is a wild symbol.

25. The method of claim 16, which is provided through a data network.

26. The method of claim 25, wherein the data network is an internet.

27. A method of operating a gaming device including a plurality of instructions, said method comprising:

(a) causing at least one processor to execute said plurality of instructions to cause a plurality of reels to generate a plurality of symbols from a plurality of symbols in a secondary game, wherein said plurality of symbols in the secondary game includes at least one terminator symbol and at least one anti-terminator symbol, and each of said plurality of reels includes a plurality of said symbols;

(b) causing the at least one processor to execute said plurality of instructions to determine if said generated symbols form a winning symbol combination;

(c) providing a player any award associated with any determined winning symbol combination;

(d) causing the at least one processor to execute said plurality of instructions to determine whether any of said terminator symbols or said anti-terminator symbols are generated on said reels;

(e) causing the at least one processor to execute said plurality of instructions to accumulate any of said terminator symbols and said anti-terminator symbols determined to have been generated;

(f) causing the at least one processor to execute said plurality of instructions to determine a value formed from subtracting any accumulated anti-terminator symbols by any accumulated terminator symbols, wherein if said value is at least equal to a predetermined value, said secondary game is terminated; and (g) repeating (a) to (f) at least once if said secondary game is not terminated.

28. The method of claim 27, which includes causing the at least one processor to execute said plurality of instructions to accumulate said terminator symbols and said anti-terminator symbols over multiple generations of said symbols.

29. The method of claim 27, which is provided through a data network.

30. The method of claim 27, wherein the data network is an internet.

* * * * *

UNITED STATES PATENT AND TRADEMARK OFFICE

CERTIFICATE OF CORRECTION

PATENT NO. : 7,690,982 B2
APPLICATION NO. : 11/210314
DATED : April 6, 2010
INVENTOR(S) : Cuddy It is certified that error appears in the above-identified patent and that said Letters Patent is hereby corrected as shown below:

IN THE CLAIMS:

In Claim 16, Column 17, line 58, insert --to-- between “reels” and “generate”.

Signed and Sealed this

Thirteenth Day of July, 2010

David J. Kappos

*Director of the United States Patent and Trademark Office*